June 16, 1942.
B. M. HYMAN ET AL
2,286,279
EAR STRAIGHTENER FOR CORN PICKERS
Filed Oct. 9, 1939
3 Sheets-Sheet 1
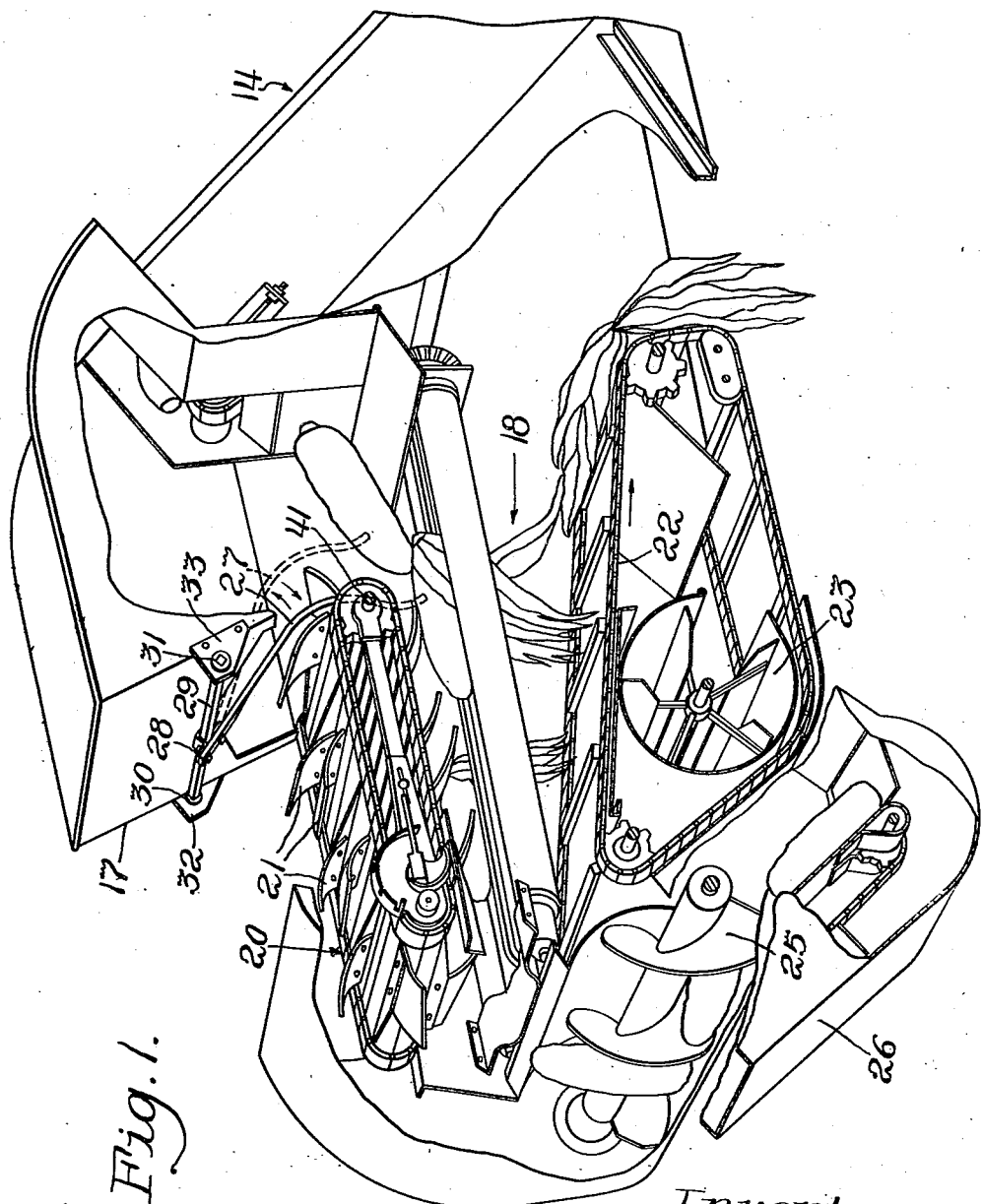
Inventors
Benjamin M. Hyman
and Rector C. Ferguson
By Paul O. Pippel
Att'y.

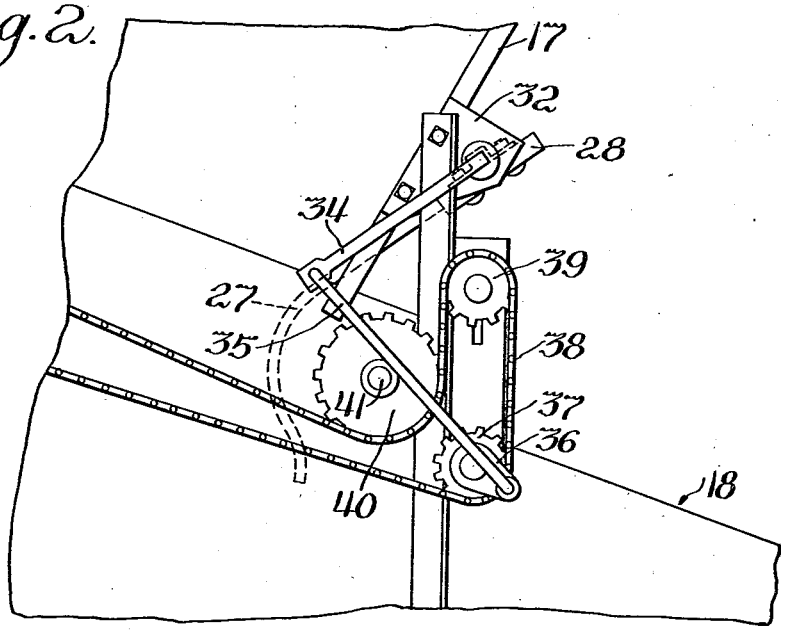
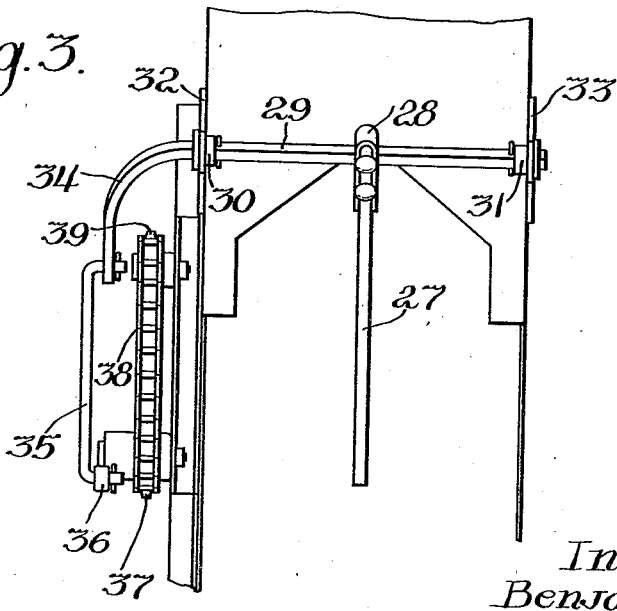
*Inventors*
*Benjamin M. Hyman*
and *Rector C. Fergason*
By Paul O. Pippel
Atty.

June 16, 1942.   B. M. HYMAN ET AL   2,286,279
EAR STRAIGHTENER FOR CORN PICKERS
Filed Oct. 9, 1939   3 Sheets-Sheet 3

Inventors
Benjamin M. Hyman
and Rector C. Ferguson
By Paul O. Pippel
Att'y.

Patented June 16, 1942

2,286,279

UNITED STATES PATENT OFFICE 2,286,279

EAR STRAIGHTENER FOR CORN PICKERS

Benjamin M. Hyman, Moline, Ill., and Rector C. Fergason, La Porte, Ind., assignors to International Harvester Company, a corporation of New Jersey Application October 9, 1939, Serial No. 298,554

2 Claims. (Cl. 130—5)

This invention relates to an ear straightener for corn pickers.

The husking mechanism of a corn picker consists of at least a pair of husking rolls along which ears are fed, and the husks are stripped therefrom by the rotation of the rolls. For proper husking, it is desirable that the ears be fed along the rolls with their length parallel to the rolls.

An object of the present invention is to provide an ear straightener for a husker.

A further object is the provision of a device for causing ears of corn to be husked to come into contact with the husking roll with their axes paralleling those of the rolls.

Another object is to provide an ear straightener for a husking mechanism which is self-cleaning.

According to the present invention, an ear forwarder comprising an endless belt provided with ear flaps is positioned over the husking rolls in spaced relation to one end thereof. An ear straightener comprising an oscillatable rod is mounted over the husking rolls so as to move back and forth along the rolls from a position between the flaps at the end of the ear forwarder. The action of the straightener is to push back along the rolls any ears or other material which fall cross-wise of the rolls and thereby eventually to cause the ears and other material to extend longitudinally of the rolls. The passing of the straightener between the flaps of the ear forwarder assures the automatic cleaning of the straightener.

In the drawings:

Figure 1 is a perspective view with parts removed of the husking unit of a corn picker;

Figure 2 is a side view of a portion of a husking unit showing the manner in which the novel ear straightener is mounted and driven;

Figure 3 is an end view of the parts of Figure 2;

The corn picker with which the ear straightener of the present invention is associated is shown and claimed in applicants' copending application, Serial No. 210,464, filed May 27, 1938. Only so much of the corn picker as pertains to the ear straightener will be described in the present invention.

Figure 4:
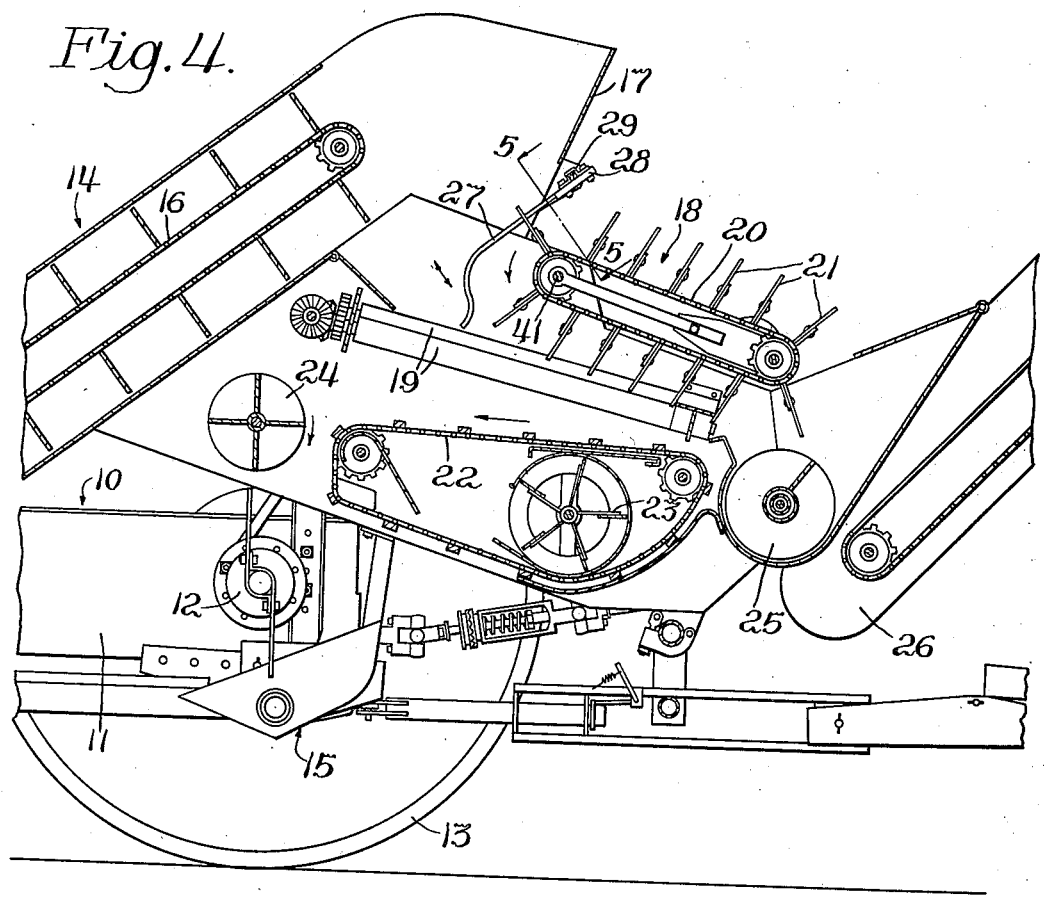
Figure 4 is a longitudinal sectional view through the husking unit.

As shown in Figure 4, there is the rear portion of a tractor 10 having a body portion 11, rear axle 12 and rear wheels 13, of which only one is shown. A corn picker 14 is positioned over the rear axle 12 and is carried thereby by means of framework 15. The corn picker includes a conveyer 16 extending from a gathering unit, not shown, and discharging through a hood or chute portion 17 into a husker 18. The husker includes at least a pair of downwardly extending husking rolls 19, and an ear forwarder comprising an endless belt 20 having a pair of rows of ear flaps 21 secured thereto. Beneath the husking rolls is a husk conveyer 22 in the form of an endless belt. A fan 23 is located within the husk conveyer 22. A beater 24 is positioned adjacent the discharge end of the husking conveyer 22 and serves to prevent the entangling of the husks with the axle 12 and framework 15. Adjacent the lower or discharge end of the husking roll 19 is an auger conveyer 25 which is adapted to transfer husked ears laterally to a wagon elevator 26.

Figure 5:
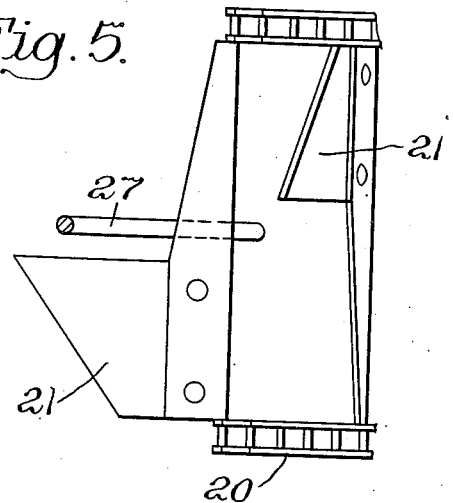
Figure 5 is a view taken along the line 5—5 of Figure 4.

The ear straightener of the present invention will now be described. It comprises essentially a curved rod 27, the lower end of which extends down to the husking rolls and between the rows of ear flaps 21, as shown in Figures 4 and 5. The upper end of the rod 27 is secured by a clamp 28 to a member 29 of square section. The member 29 is rotatably mounted by means of bearing members 30 and 31 journaled in plates 32 and 33 secured to the shell 17. An end 34 of the member 29 is curved to extend at right angles to the body of the member 29 and has an opening therein which receives the end of a link 35. The other end of the link 35 is pivoted in a crank 36 secured to an idler gear 37 rotatably mounted on the husker 18. The gear 37 is driven by a chain 38 which drives another idler gear 39 and is itself driven by a gear 40 which is in turn driven by a drive shaft 41 driving the ear forwarder. Rotation of the gear 37 effects an oscillation of the end 34 of the member 29 and consequently an oscillation of the ear straightener rod 27. Thus, the rod 27 has a movement of oscillation about an axis included in the member 29 transverse of the axis of the husking rolls in a plane parallel to the axes of the husking rolls.

The operation of the ear straightener is as follows:

Ears of corn are conveyed from the gathering unit of the corn picker by the conveyer 16 and dumped through the opening in the shell 17 onto the upper end of the husking roll 19. The ears and other material tend to slide down along the husking rolls and are aided therein by the ear forwarder. Rotation of the husking rolls causes the husks to be stripped from the ears and to fall upon the husk conveyer 22. The action of the oscillating ear straightener rod 27 is to kick husks or other material which has fallen transversely of the rolls. The result is to straighten the ears and whatever other material there may be so that they may be fed longitudinally of the rolls. The other material, which may include corn stalks, leaves or husks, will be fed down through the rolls to the husk conveyer so long as they extend longitudinally of the rolls. If the corn stalks, etc., fell transversely of the husking rolls and there were no straightener, there would be a clogging of the rolls and possibly an eventual stopping of the mechanism. The rod 27 is self-cleaning or self-wiping in that it passes between the rows of flaps 21 and they scrape off any material that may have become entangled with the rod.

It will be apparent from the foregoing description that a new and novel ear straightener device has been provided. The ear straightener insures an arranging of the ears and any foreign material longitudinally of the rolls so that the ears may be husked and the foreign material properly fed between the rolls down to the husk conveyer. The ear straightener is self-cleaning.

The intention is to limit the invention only within the scope of the appended claims.

What is claimed is:

1. In combination, husking rolls, an ear forwarder extending along the rolls from a point spaced from one end thereof and comprising a carrying means and flaps spaced longitudinally and extending downwardly toward the husking rolls at an angle to the carrying means, and an oscillatable ear straightener positioned over the end of the husking rolls from which the ear forwarder is spaced, and means for moving the flaps of the ear forwarder lengthwise in wiping relation with respect to the ear straightener and longitudinally of the rolls in pressing engagement therewith.

2. In combination, downwardly extending husking rolls, conveying means discharging onto the upper end of the rolls, an ear forwarder comprising an endless belt extending and forwarding from a point spaced from the upper end of the husking rolls and having rows of flaps secured thereto and normally maintained at an angle to the belt over the husking rolls, and an ear straightener comprising a member positioned over the rolls and oscillatable about an axis extending at right angles to the rolls from a position at one end of the ear forwarder allowing wiping engagement with the flaps on the forwarder, the movement of the ear straightener being in a plane transverse to the plane in which the husking rolls lie, the movement of the flaps during wiping engagement with the straightener being lengthwise of the straightener.

BENJAMIN M. HYMAN.
RECTOR C. FERGASON.